(12) United States Patent
Arima et al.

(10) Patent No.: US 10,823,884 B2
(45) Date of Patent: Nov. 3, 2020

(54) DIFFUSER PLATE, DISPLAY DEVICE, PROJECTION DEVICE, AND LIGHTING DEVICE

(71) Applicant: DEXERIALS CORPORATION, Tokyo (JP)

(72) Inventors: Mitsuo Arima, Tokyo (JP); Masayuki Ishiwata, Tokyo (JP); Tsutomu Nagahama, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 182 days.

(21) Appl. No.: 15/753,751

(22) PCT Filed: Sep. 30, 2016

(86) PCT No.: PCT/JP2016/079150
§ 371 (c)(1),
(2) Date: Feb. 20, 2018

(87) PCT Pub. No.: WO2017/057744
PCT Pub. Date: Apr. 6, 2017

(65) Prior Publication Data
US 2018/0284326 A1    Oct. 4, 2018

(30) Foreign Application Priority Data
Oct. 2, 2015  (JP) .................. 2015-197187

(51) Int. Cl.
*G02B 13/20*    (2006.01)
*G02B 5/02*     (2006.01)
(Continued)

(52) U.S. Cl.
CPC ............ *G02B 5/0205* (2013.01); *F21V 3/049* (2013.01); *F21V 5/004* (2013.01); *G02B 3/0043* (2013.01);
(Continued)

(58) Field of Classification Search
CPC .. G02B 5/0242; G02B 5/0278; G02B 5/0236; G02B 5/0268; G02B 5/0221; G02B 5/02;
(Continued)

(56) References Cited

U.S. PATENT DOCUMENTS

| 6,201,642 B1 * | 3/2001 | Bos ......................... B60R 1/00 359/504 |
| 2002/0034710 A1 | 3/2002 | Morris et al. |

(Continued)

FOREIGN PATENT DOCUMENTS

| CN | 1688907 A | 10/2005 |
| CN | 101963678 A | 2/2011 |

(Continued)

OTHER PUBLICATIONS

May 7, 2019, European Search Report issued for related EP Application No. 16851913.0.
(Continued)

*Primary Examiner* — William R Alexander
*Assistant Examiner* — Tamara Y. Washington
(74) *Attorney, Agent, or Firm* — Paratus Law Group, PLLC

(57) ABSTRACT

There is provided a diffuser plate, a display device, a projection device, and a lighting device that can achieve more even diffusion angle distribution properties, the diffuser plate being of a microlens array type, and including: a single lens group located on a surface of a transparent base material, in which aperture sizes and radii of curvatures of respective single lenses constituting the single lens group vary in the single lens group as a whole, and vertex positions of the respective single lenses are located irregularly, and energy distribution of light that transmits through the single lens group is substantially even in a predetermined diffusion angle range.

11 Claims, 23 Drawing Sheets

(51) Int. Cl.
*F21V 5/00* (2018.01)
*G02B 3/00* (2006.01)
*F21V 3/04* (2018.01)
*G03B 21/14* (2006.01)
*G02B 27/09* (2006.01)

(52) U.S. Cl.
CPC ....... *G02B 5/0221* (2013.01); *G02B 27/0955* (2013.01); *G03B 21/14* (2013.01)

(58) Field of Classification Search
CPC ..... G02B 5/0252; G02B 3/0043; F21V 5/002; F21V 11/00; F21V 3/049; F21V 11/16; F21V 13/08; F21V 13/10
USPC .......................................................... 359/599
See application file for complete search history.

(56) References Cited

U.S. PATENT DOCUMENTS

2004/0130790 A1* 7/2004 Sales ................ G02B 3/0043
   359/619
2015/0234264 A1* 8/2015 Kurosaki ............ G03B 21/204
   353/31
2015/0293271 A1* 10/2015 Miyasaka ............ H04N 9/3152
   353/38

FOREIGN PATENT DOCUMENTS

| | | |
|---|---|---|
| CN | 102472841 A | 5/2012 |
| CN | 102508325 A | 6/2012 |
| CN | 103185907 A | 7/2013 |
| CN | 103430056 A | 12/2013 |
| CN | 104110649 A | 10/2014 |
| CN | 104570172 A | 4/2015 |
| JP | H03-192232 A | 8/1991 |
| JP | 2004-505306 A | 2/2004 |
| JP | 2004-145330 A | 5/2004 |
| JP | 2006-500621 A | 1/2006 |
| JP | 2010-123436 A | 6/2010 |
| JP | 2011-511310 A | 4/2011 |
| JP | 2014-510952 A | 5/2014 |
| JP | 2015-079232 A | 4/2015 |
| WO | WO 2004/027495 A2 | 4/2004 |
| WO | WO 2014/076020 A1 | 5/2014 |

OTHER PUBLICATIONS

Sep. 10, 2019, Japanese Office Action issued for related JP Application No. 2015-197187.
Mar. 2, 2020, Chinese Office Action issued for related CN Application No. 201680056926.X.

* cited by examiner

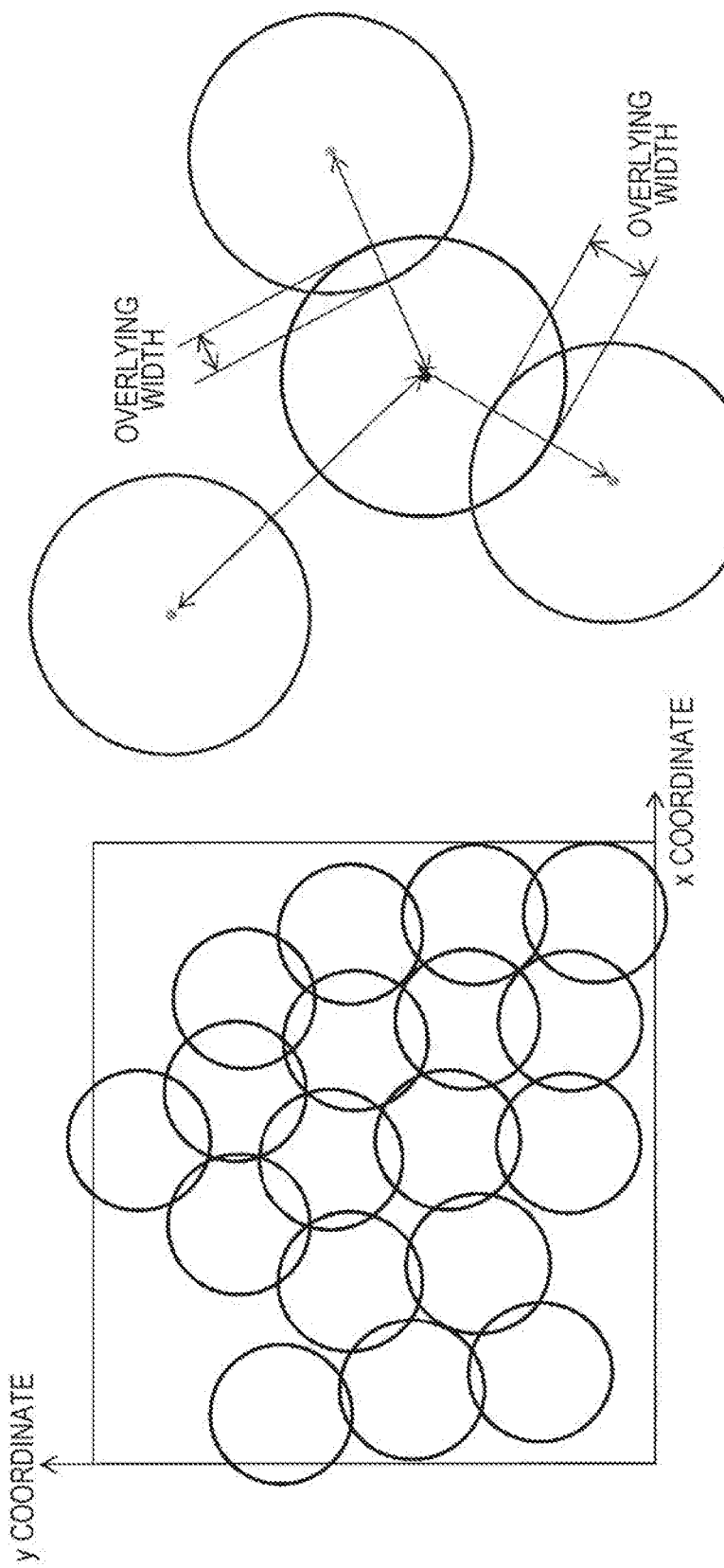

FIG. 14
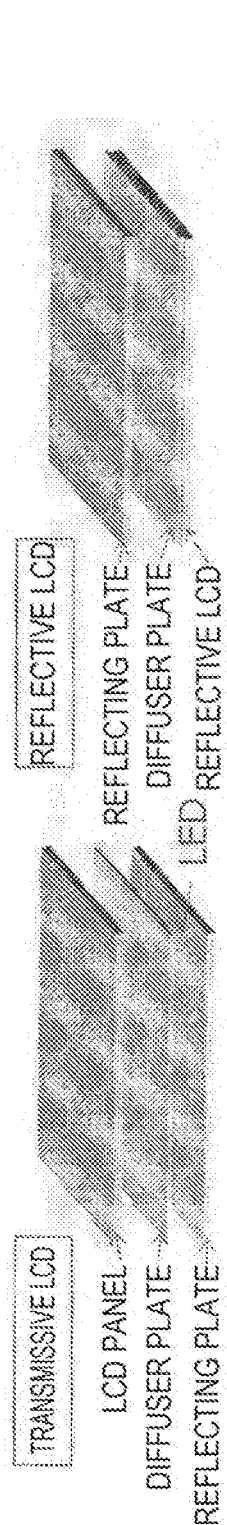
1. LCD BACKLIGHT (TRANSMISSION/REFLECTION)
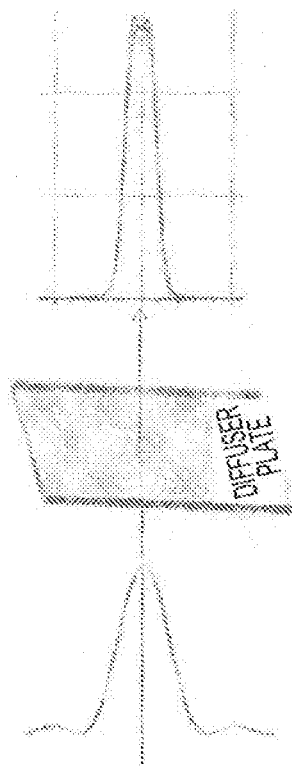
2. OPTICAL SHAPING
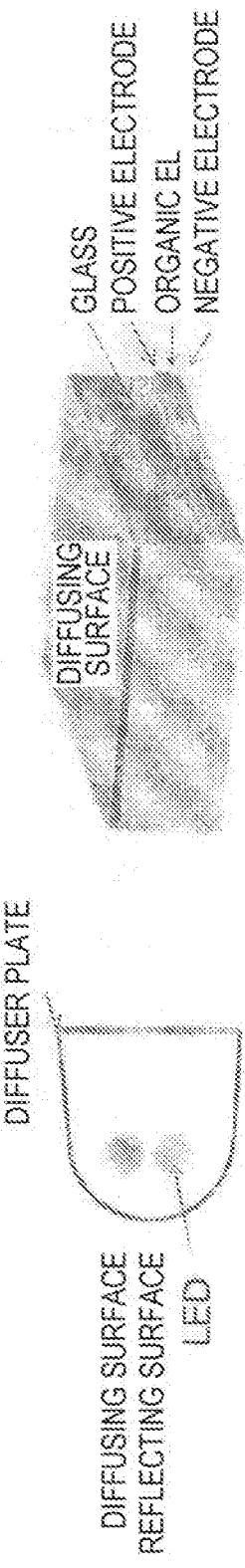
3. LIGHTING SYSTEM

FIG. 15
EXAMPLE 1_STRUCTURE ANALYSIS CALCULATION
Φ 45μm ±10%
R 40μm ±10%
G 28μm (38)
M 11μm (20)
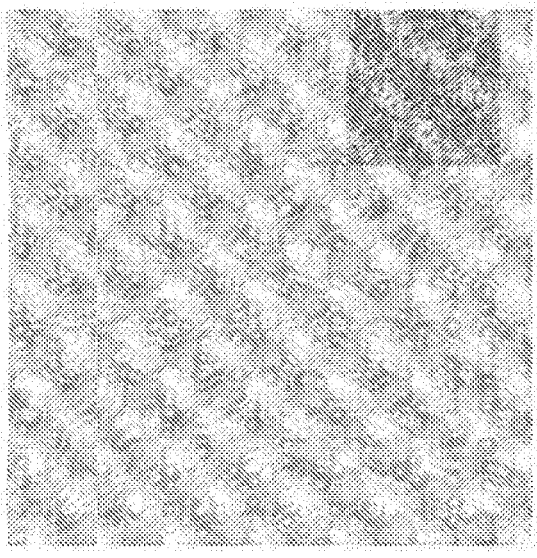
CALCULATION MODEL
MAXIMUM ELEVATION DIFFERENCE Z 9.7μm
Trans
±18° SYSTEM : GEOMETRICAL-OPTICAL DIFFUSION DISTRIBUTION
(CORRESPONDING TO ±13°) : WAVE OPTICAL DIFFUSION DISTRIBUTION
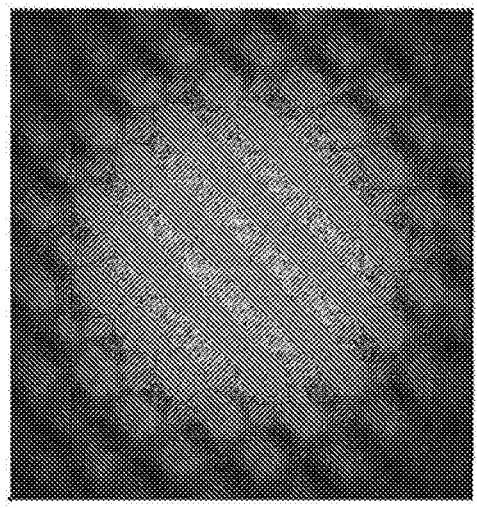
CALCULATED LIGHT DISTRIBUTION

FIG. 17
EXAMPLE 4_STRUCTURE ANALYSIS CALCULATION
Trans
±35° SYSTEM : GEOMETRICAL-OPTICAL DIFFUSION DISTRIBUTION
(CORRESPONDING TO ±20°) : WAVE OPTICAL DIFFUSION DISTRIBUTION
(DIFFUSION DISTRIBUTION TO BE ACHIEVED)
Φ 30μm ±5%
R 20μm ±5%
Ex 5μm
Ov 11μm
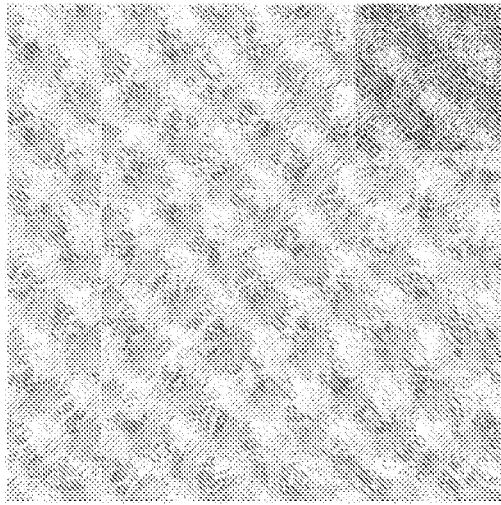
CALCULATED LIGHT DISTRIBUTION
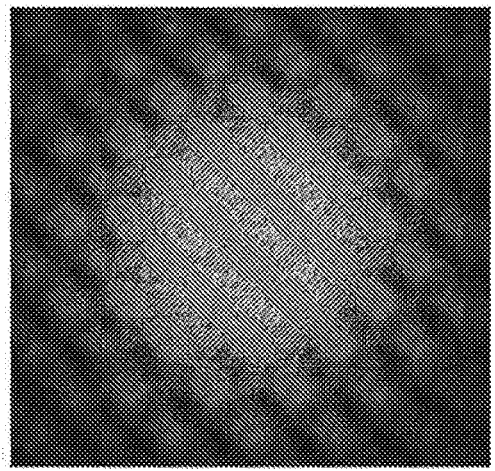
CALCULATION MODEL
MAXIMUM ELEVATION DIFFERENCE
Z 10.2μm

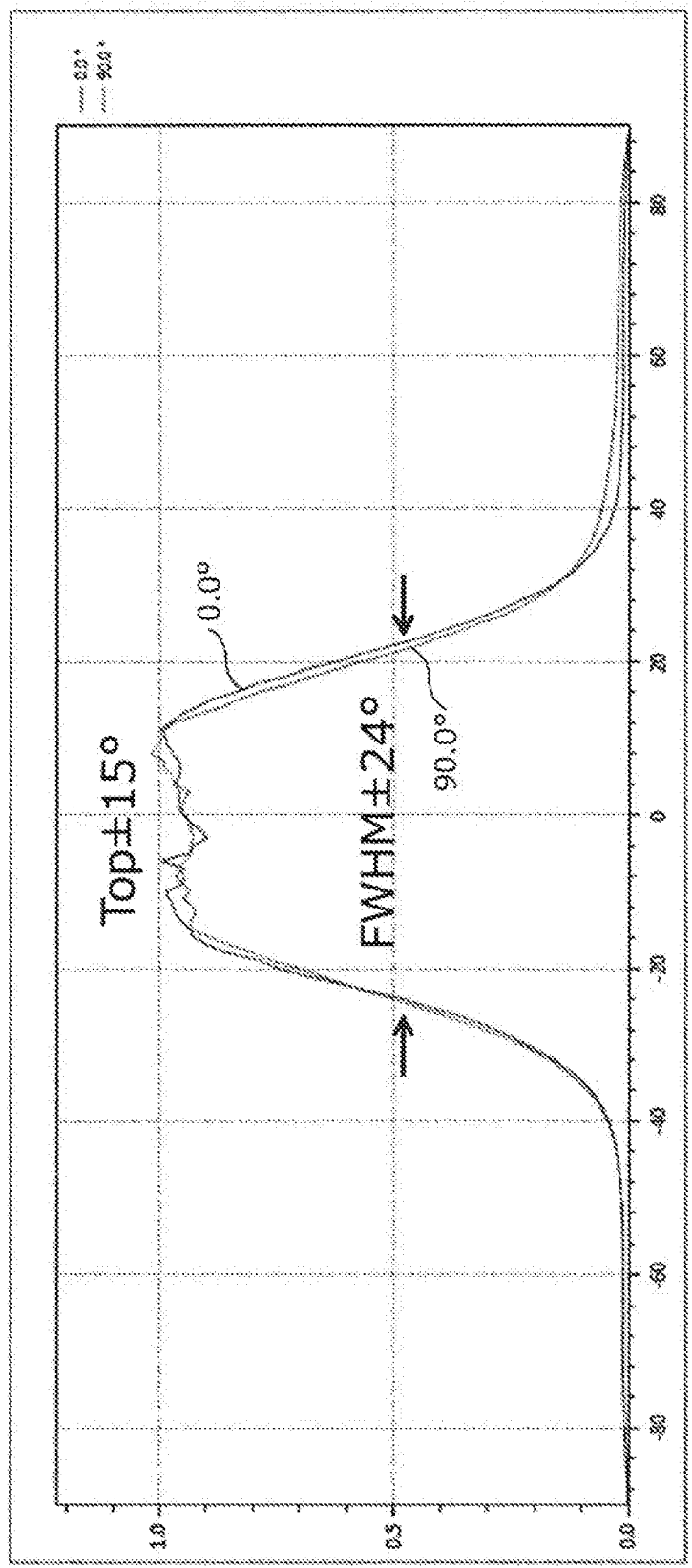

DIFFUSER PLATE, DISPLAY DEVICE, PROJECTION DEVICE, AND LIGHTING DEVICE

CROSS REFERENCE TO PRIOR APPLICATION

This application is a National Stage Patent Application of PCT International Patent Application No. PCT/JP2016/079150 (filed on Sep. 30, 2016) under 35 U.S.C. § 371, which claims priority to Japanese Patent Application No. 2015-197187 (filed on Oct. 2, 2015), which are all hereby incorporated by reference in their entirety.

TECHNICAL FIELD

The present invention relates to a diffuser plate, a display device, a projection device, and a lighting device.

BACKGROUND ART

A diffuser plate that scatters incoming light to various directions is widely utilized in various devices, for example, a display device such as a display, a projection device such as a projector, and various types of lighting devices. An incoming light diffusing mechanism in this diffuser plate is roughly classified into a mechanism that utilizes light refraction resulting from the surface shape of the diffuser plate and a mechanism that utilizes scattering by a substance existing inside a bulk body and having different refractive index from the circumference. One of the diffuser plates which utilize the light refraction resulting from the surface shape is what is called a microlens array diffuser plate including a plurality of microlenses having sizes of approximately several tens of micrometers and located on the surface of the bulk body.

As such a microlens array diffuser plate, Patent Literature 1 below discloses a diffuser plate for a reticle, and such a diffuser plate is designed to have variations in pitches and heights of microlenses. Specifically, Patent Literature 1 below discloses that a microlens pitch P is set at 8 µm≤P≤30 µm and setting a microlens height H is set at 0.01×P≤H≤0.1×P.

In addition, as the microlens array diffuser plate, Patent Literature 2 below discloses that, by setting a diameter (D) of microlenses constituting a microlens array at more than or equal to 100 µm and less than or equal to 1000 µm and setting a surface roughness (Ra) of the microlenses at more than or equal to 0.1 µm and less than or equal to 10 µm, a light diffusion effect is imparted to the lens surface. In this Patent Literature 2, an arrangement pattern of the microlenses is a random arrangement pattern similarly to Patent Literature 1 above, but introduction of randomness for the microlens height is denied stating that stress concentration can be reduced by keeping the microlens height constant.

CITATION LIST

Patent Literature

Patent Literature 1: JP H3-192232A
Patent Literature 2: JP 2004-145330A

SUMMARY OF INVENTION

Technical Problem

However, Patent Literature 1 above fails to mention the radius of curvature of each microlens, and has a problem in that it is difficult to achieve more even (flat) diffusion angle distribution properties. In addition, even if the technology disclosed in Patent Literature 2 above is used, it is difficult to achieve more even (flat) diffusion angle distribution properties.

Thus, the present invention was made in view of the above-described problems, and the present invention has an object to provide a diffuser plate, a display device, a projection device, and a lighting device that can achieve more even diffusion angle distribution properties.

Solution to Problem

In order to solve the above problem, according to an aspect of the present invention, there is provided a diffuser plate of a microlens array type, the diffuser plate including: a single lens group located on a surface of a transparent base material, in which aperture sizes and radii of curvatures of respective single lenses constituting the single lens group vary in the single lens group as a whole, and vertex positions of the respective single lenses are located irregularly, and energy distribution of light that transmits through the single lens group is substantially even in a predetermined diffusion angle range.

It is preferable that boundaries include curves different from one another, each of the boundaries being formed between one of the single lenses and an adjacent one of the single lenses.

It is preferable that Expression (1) below be satisfied, where a reference aperture size of the single lens group is represented by $\varphi$, and a perturbation width which is a degree of variations in aperture sizes in the single lens group is represented by $\Delta\varphi$.

[Math. 1]

$$5\% \leq \left|\frac{\Delta\phi}{\phi}\right| \leq 25\% \qquad \text{Expression (1)}$$

It is preferable that Expression (2) below be satisfied, where a reference radius of curvature of the single lens group is represented by R, and a perturbation width which is a degree of variations in radii of curvatures in the single lens group is represented by $\Delta R$.

[Math. 2]

$$5\% \leq \left|\frac{\Delta R}{R}\right| \leq 70\% \qquad \text{Expression (2)}$$

It is preferable that Expression (3) below be satisfied, where that a maximum elevation difference in the vertex positions between the single lenses constituting the single lens group is represented by $\Delta Z_{max}$, and a maximum vertex height in the single lens group is represented by Z.

[Math. 3]

$$\left|\frac{\Delta Z_{max}}{Z}\right| \geq 0.015 \qquad \text{Expression (3)}$$

It is preferable that Expression (4) below be satisfied, where, in energy distribution of light that transmits through the single lens group, a diffusion angle range in which the energy distribution becomes substantially even is represented by $\theta_{top}$, and a full width at half maximum of the energy distribution is represented by $\theta_{FWHM}$.

[Math. 4]

$$\frac{\theta_{top}}{\theta_{FWHM}} \geq \frac{1}{3} \quad \text{Expression (4)}$$

The vertex positions of the respective single lenses constituting the single lens group may be located irregularly using positions of vertices of the respective single lenses when assuming that the single lenses are arranged regularly as a reference, such that a moved amount from the reference falls within a predetermined range. In this case, it is preferable that Expression (5) below be satisfied, where the moved amount at maximum in the single lens group is represented by M, a reference aperture size of the single lens group is represented by φ, and a reference radius of curvature of the single lens group is represented by R.

[Math. 5]

$$\frac{M}{2} \times \frac{2}{\sqrt{\phi^2 + R^2}} \geq 0.12 \quad \text{Expression (5)}$$

Further, it is preferable that $\Delta r/\phi \neq 0$ be satisfied, where the moved amount from the reference in the single lens group is represented by $\Delta r$, and a reference aperture size of the single lens group is represented by φ.

The respective single lenses constituting the single lens group may be located irregularly on the transparent base material. In this case, it is preferable that Expression (6) below be satisfied, where a maximum value of an overlying width between the single lenses adjacent to each other in the single lens group is represented by $O_v$, a reference aperture size of the single lens group is represented by φ, and a reference radius of curvature of the single lens group is represented by R.

[Math. 6]

$$\frac{O_v}{\sqrt{\phi^2 + R^2}} \geq 0.12 \quad \text{Expression (6)}$$

The transparent base material may be any of a resin substrate, a resin film, and a glass substrate.

Further, in order to solve the above problem, according to another aspect of the present invention, there is provided a display device including the diffuser plate.

Further, in order to solve the above problem, according to another aspect of the present invention, there is provided a projection device including the diffuser plate.

Further, in order to solve the above problem, according to another aspect of the present invention, there is provided a lighting device including the diffuser plate.

Advantageous Effects of Invention

According to the present invention as described above, it is possible to achieve more even diffusion angle distribution properties.

BRIEF DESCRIPTION OF DRAWINGS

FIG. 7A is an explanatory diagram for describing a locating method of the single lens group that the diffuser plate according to the embodiment includes.

FIG. 14 is an explanatory diagram schematically illustrating an example of an application example of the diffuser plate according to the embodiment.

FIG. 15 is an explanatory diagram for describing results of Example 1.

FIG. 17 is an explanatory diagram for describing results of Example 4.

FIG. 18 is an explanatory diagram for describing results of Example 4.

DESCRIPTION OF EMBODIMENTS

Figure 1:
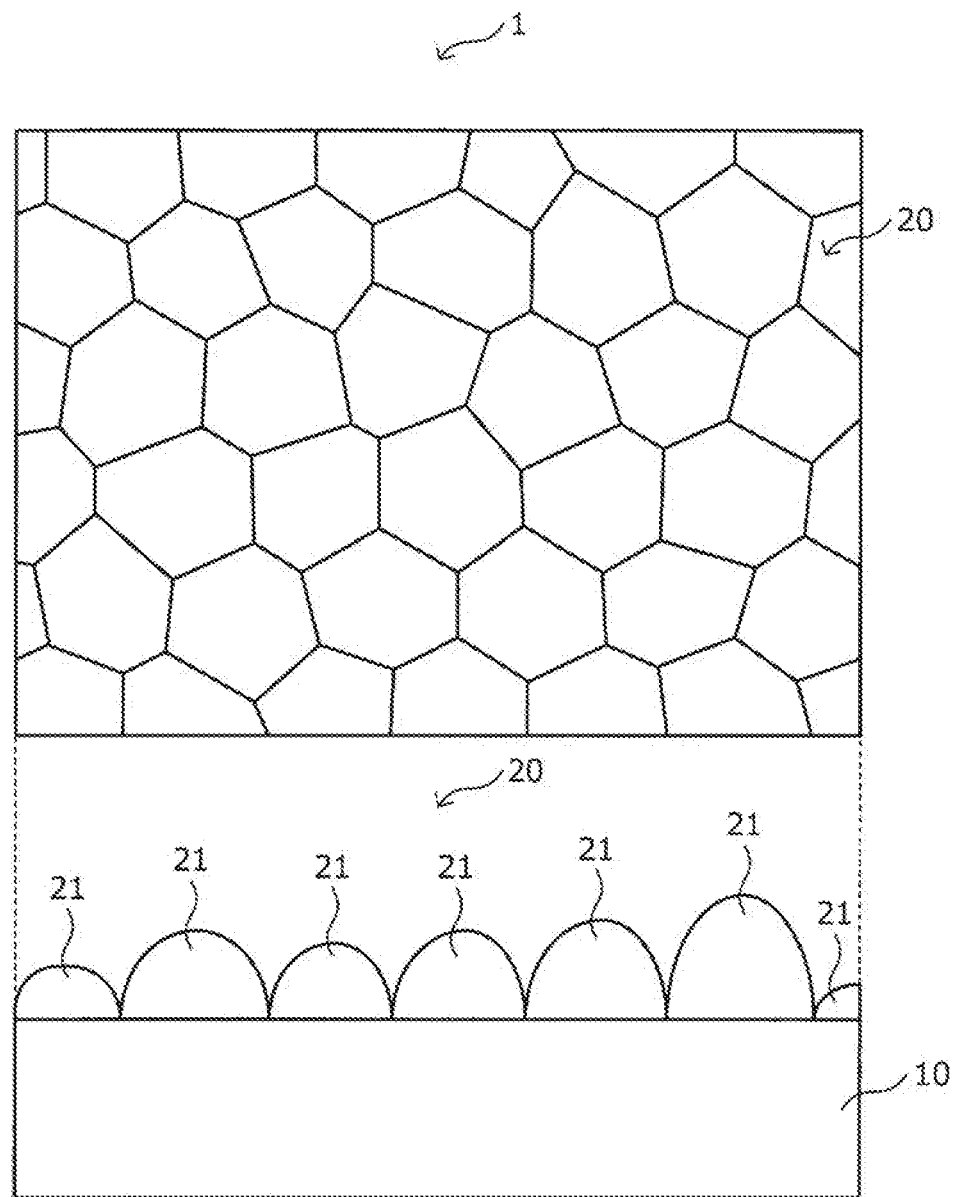
FIG. 1 is an explanatory diagram schematically illustrating a structure of a diffuser plate according to an embodiment of the present invention.

Hereinafter, (a) preferred embodiment(s) of the present invention will be described in detail with reference to the appended drawings. Note that, in this specification and the appended drawings, structural elements that have substantially the same function and structure are denoted with the same reference numerals, and repeated explanation of these structural elements is omitted.

(Overview of Diffuser Plate According to Embodiment of Present Invention)

Prior to describing a diffuser plate according to an embodiment of the present invention in detail, an overview of the diffuser plate according to an embodiment of the present invention will be mentioned below briefly.

The diffuser plate according to an embodiment of the present invention as will be described below in detail is a microlens array diffuser plate having light homogeneous diffusion and optical aperture homogeneous expanding functions. Optical bodies (that is, microlenses) that this diffuser plate has are structures characterized in that the optical bodies are different in shape of convex surfaces or concave surfaces each having the light diffusion function from one another, and that a boundary contour of each lens is in contact with an adjacent lens with a different curve.

In a case of optical bodies with a conventional microlens array structure as disclosed in Patent Literature 1 and Patent Literature 2 above, a general Gaussian light diffusion function and a moiré reducing function in imaging equipment may only be added, and there is a problem in that it is difficult to satisfy distribution properties of homogeneous energy distribution. That is, with respect to collimated light in a visible light region and telecentric light having a principal ray with a collimating property and having a certain aperture, there is a problem in that an issue concerning an optical function (hereinafter also referred to as "top hat type diffusion") that homogeneity of energy distribution is very high within an angular component in a certain region, and if the certain region of this angular component is exceeded, energy may be reduced abruptly cannot be resolved.

By providing perturbation (in other words, variations) for the locations, radii of curvatures, and circular aperture sizes of respective unit cells constituting the microlens array, the diffuser plate according to an embodiment of the present invention as will be described below in detail has optical bodies including many bents and curved surfaces that have a plurality of bent and curved surface regions different from one another, in which the boundaries of the regions are curved surfaces different from one another, and an overview projection trajectory in which tangent orientations are different from one another are sectioned with different curves. Accordingly, it is possible to resolve the issue as described above and to achieve optical bodies having a high homogeneous diffusion function.

Characteristics of the diffuser plate as will be described below in detail are summarized as follows:

1) A curved surface portion of each microlens is a spherical body or an aspherical body.

2) The locations of microlenses constituting the microlens array can be locations perturbed at random from a periodic array. In this case, $\Delta P/P \neq 0$ is satisfied, where a lattice position to serve as a reference is represented by P and a perturbation width (variation width) is represented by $\Delta P$.

3) In the above 2) case, a reference array (lattice to serve as a reference) can be a hexagonal lattice, for example. In this case, a perturbation ratio $(M/2) \times 2/(\varphi^2 \pm R^2)^{0.5}$ is more than or equal to 0.12, where a reference aperture size and a reference radius of curvature of a microlens in the reference array are represented by $\varphi$ and R, respectively, and the maximum perturbation amount is represented by M/2.

4) In the microlens array, the ratio $|\Delta\varphi/\varphi|$ of the perturbation width $\Delta\varphi$ to the reference aperture size $\varphi$ is more than or equal to 5% and less than or equal to 25%.

5) In the microlens array, the ratio $|\Delta R/R|$ of the perturbation width $\Delta R$ to the reference radius of curvature R is more than or equal to 5% and less than or equal to 70%.

6) The locations of microlenses constituting the microlens array can be a random array, not using a periodic array as a reference as in the above 2). In such a random array case, a perturbation ratio $O_v/(\varphi^2+R^2)^{0.5}$ is more than or equal to 0.12, where the reference aperture size of the microlens is (p, the reference radius of curvature is represented by R, and the maximum overlapping amount (the maximum value of the overlying width) between the microlenses is represented by $O_v$.

7) In the microlens array, the ratio $\Delta Z_{max}/Z$ is more than or equal to 0.015, where the maximum elevation difference between vertices of the respective microlenses constituting the array is represented by $\Delta Z_{max}$, and the maximum vertex height is represented by Z.

8) The respective boundaries between microlenses constituting the microlens array and adjacent microlenses have bent shapes different from one another.

9) A flat portion of an optical body (diffuser plate) on which microlenses are located is less than 10%.

Hereinafter, the diffuser plate according to an embodiment of the present invention having characteristics as described above will be described in detail.

(With Regard to Diffuser Plate)

Hereinafter, with reference to FIGS. 1 to 12, a diffuser plate 1 according to a first embodiment of the present invention will be described in detail.

Figure 2:
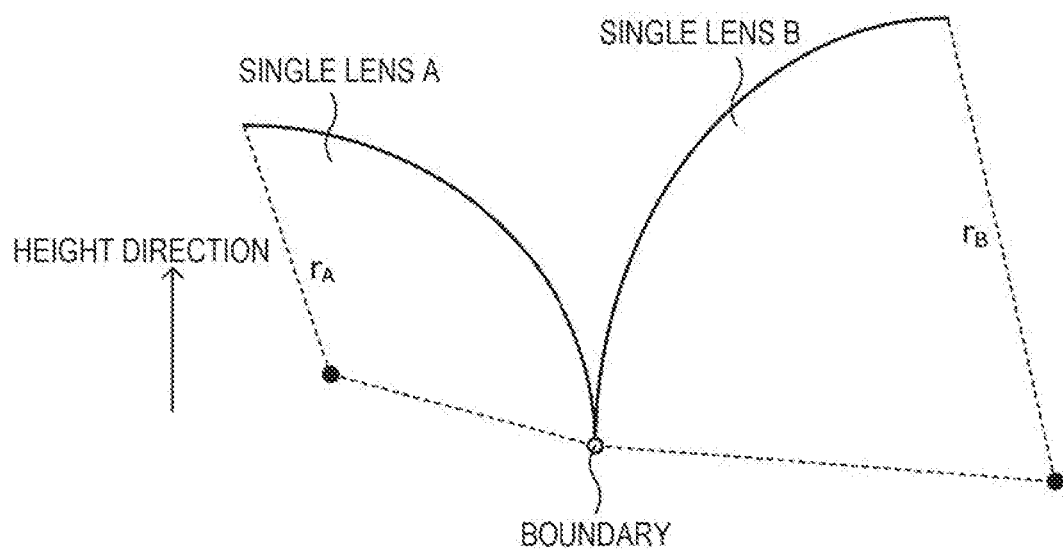
FIG. 2 is an explanatory diagram for describing single lenses that the diffuser plate according to the embodiment has.
Figure 3:
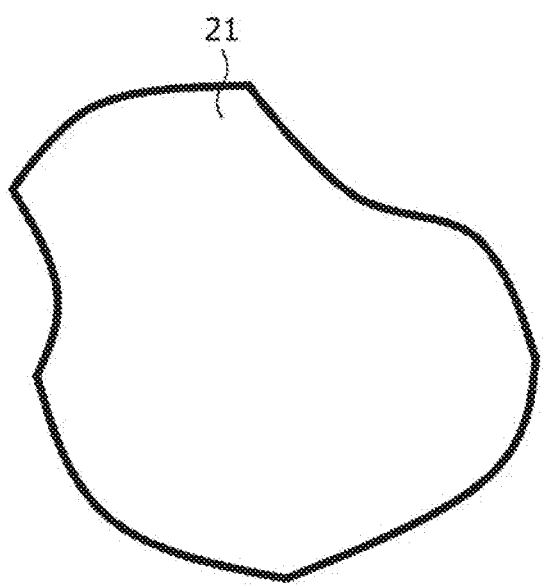
FIG. 3 is an explanatory diagram for describing single lenses that the diffuser plate according to the embodiment has.
Figure 4:
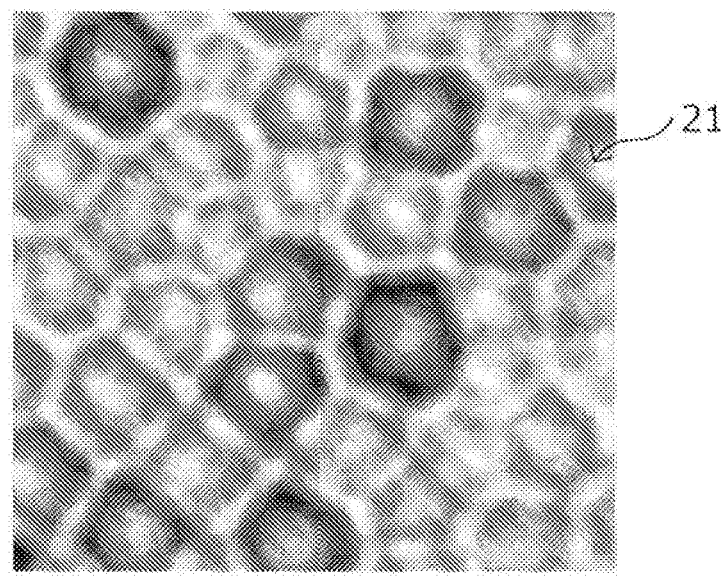
FIG. 4 is an electron micrograph of an example of a single lens group that the diffuser plate according to the embodiment includes as seen from above.
Figure 5A:
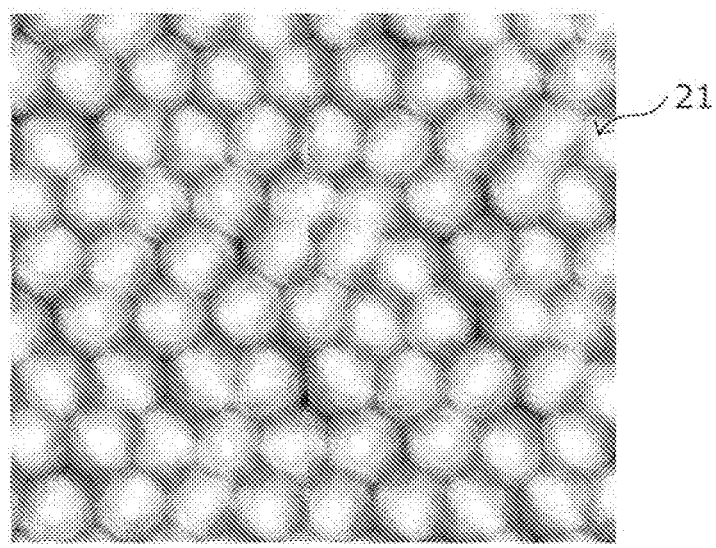
FIG. 5A is an electron micrograph of an example of a single lens group that the diffuser plate according to the embodiment includes as seen from above.
Figure 5B:
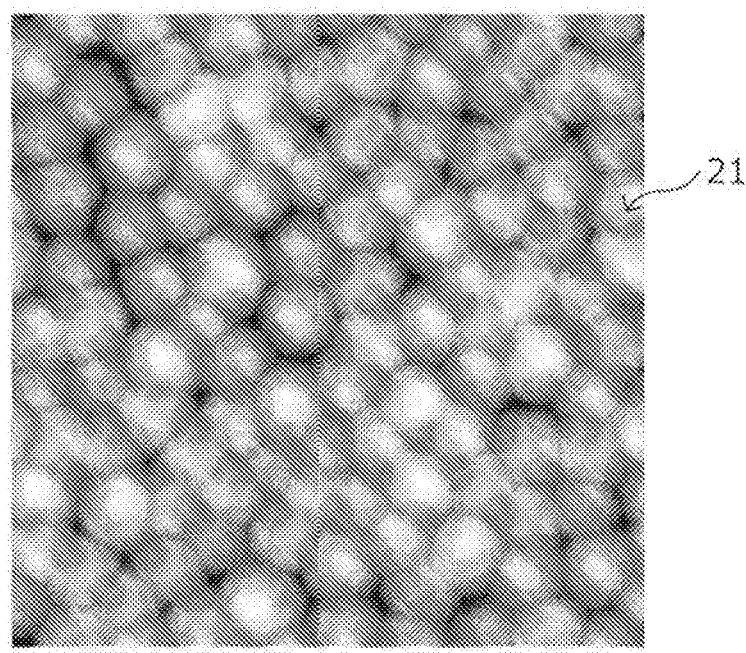
FIG. 5B is an electron micrograph of an example of a single lens group that the diffuser plate according to the embodiment includes as seen from above.
Figure 9A:
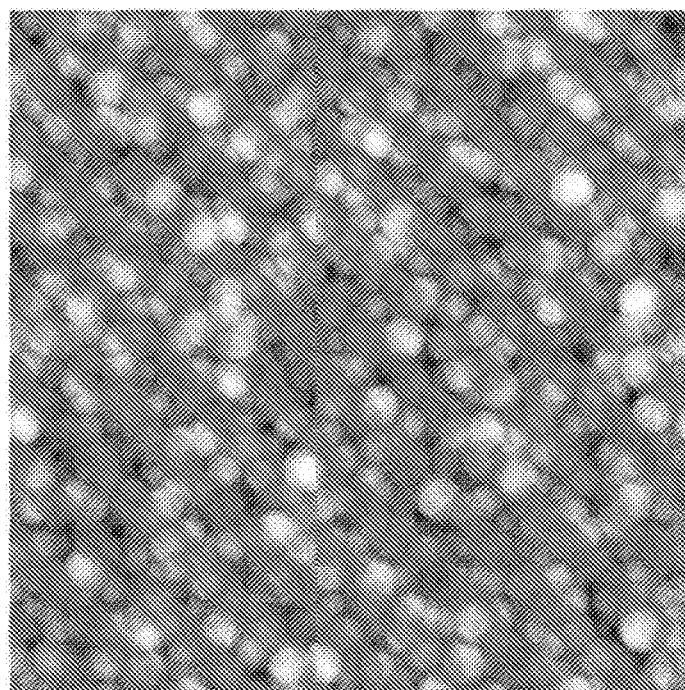
FIG. 9A is an electron micrograph of an example of the single lens group that the diffuser plate according to the embodiment includes as seen from above.
Figure 9B:
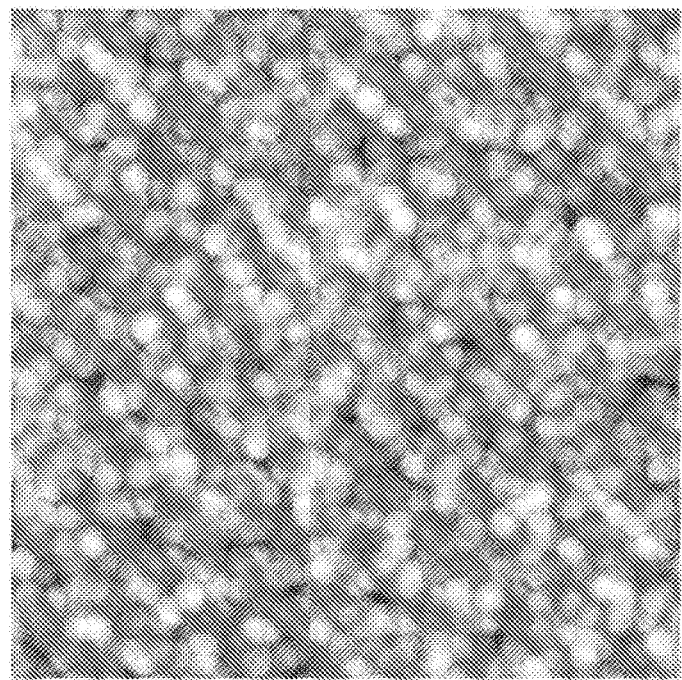
FIG. 9B is an electron micrograph of an example of the single lens group that the diffuser plate according to the embodiment includes as seen from above.
Figure 10:
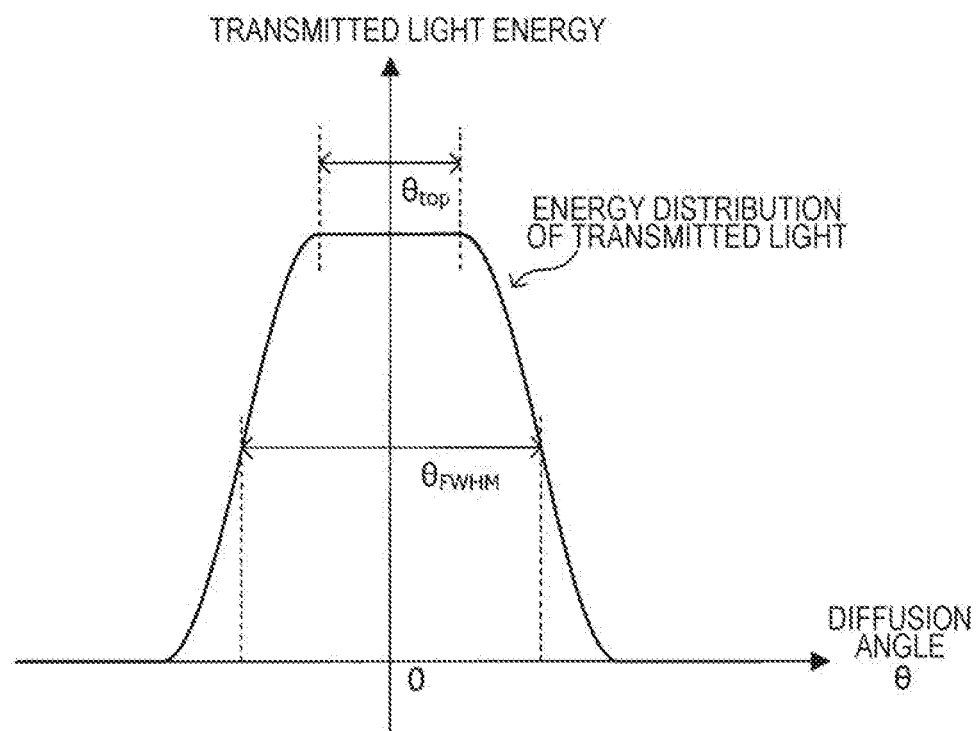
FIG. 10 is an explanatory diagram schematically illustrating an energy distribution of light having transmitted through the diffuser plate according to the embodiment.
Figure 11:
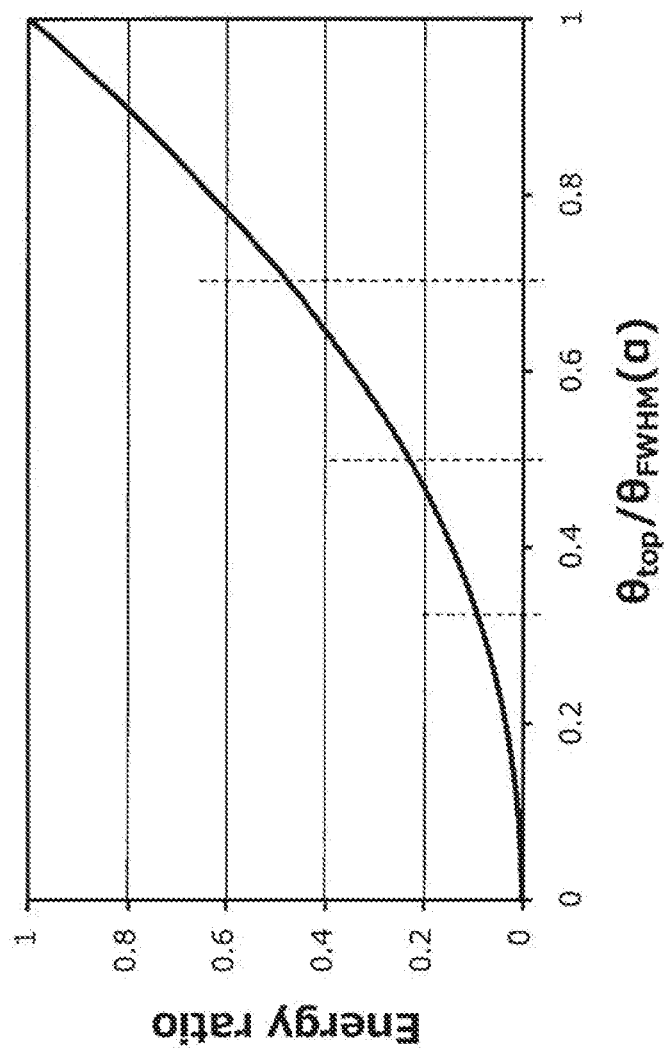
FIG. 11 is an explanatory diagram for describing an energy distribution of light having transmitted through the diffuser plate according to the embodiment.
Figure 12:
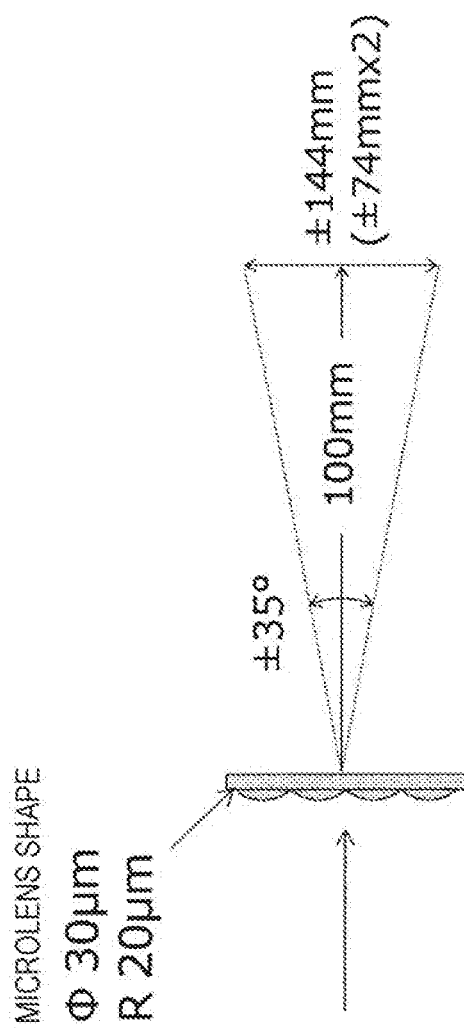
FIG. 12 is an explanatory diagram illustrating an example of geometrical-optical diffusion properties of the diffuser plate according to the embodiment.

FIG. 1 is an explanatory diagram schematically illustrating a structure of the diffuser plate according to the present embodiment. FIGS. 2 and 3 are each an explanatory diagram for describing single lenses that the diffuser plate according to the present embodiment has. FIGS. 4 to 5B are each an electron micrograph of an example of a single lens group that the diffuser plate according to the present embodiment includes as seen from above. FIGS. 6A to 7B are each an explanatory diagram for describing a locating method of the single lens group that the diffuser plate according to the present embodiment includes. FIGS. 8A to 9B are each an electron micrograph of an example of the single lens group that the diffuser plate according to the present embodiment includes as seen from above. FIG. 10 is an explanatory diagram schematically illustrating energy distribution of light having transmitted through the diffuser plate according to the present embodiment. FIG. 11 is an explanatory diagram for describing energy distribution of light having transmitted through the diffuser plate according to the present embodiment. FIG. 12 is an explanatory diagram illustrating an example of geometrical-optical diffusion properties of the diffuser plate according to the present embodiment.

The diffuser plate 1 according to the present embodiment is a microlens array diffuser plate including a plurality of microlens (hereinafter, also referred to as "single lens") located on a base material. Such a diffuser plate 1 includes, as schematically illustrated in FIG. 1, a transparent base material 10 and a single lens group 20 formed on a surface of the transparent base material 10.

<With Regard to Transparent Base Material 10>

The transparent base material 10 is a base material made of material that can be assumed as transparent in a wavelength band of light that enters into the diffuser plate 1 according to the present embodiment. Such a transparent base material 10 may be a film-like material or may be a plate-like material. The material of such a base material is not particularly limited, and it is also possible to use publicly-known resin such as polymenthyl methacrylate (PMMA), polyethylene terephthalate (PET), polycarbonate (PC), or cyclo olefin copolymer (COC), for example, as the transparent base material 10, and it is also possible to use publicly-known optical glass such as quartz glass, borosilicate glass, or white glass plate. Although FIG. 1 illustrates an example in which the transparent base material 10 is rectangular, the shape of the transparent base material 10 is not limited to a rectangle, but may have an arbitrary shape, depending on the shape of a display device, a projection device, a lighting device, or the like in which the diffuser plate 1 is provided, for example.

<With Regard to Single Lens Group 20>

The single lens group 20 composed of a plurality of single lenses 21 is formed on the surface of the transparent base material 10. In the diffuser plate 1 according to the present embodiment, the single lens group 20 is preferably formed in such a manner that a plurality of single lenses 21 are adjacent to each other (in other words, in such a manner that a gap (flat portion) does not exist between the single lenses 21) as schematically illustrated in FIG. 1. A component of incoming light that transmits through the diffuser plate surface as it is without scattering on the diffuser plate surface (hereinafter, also referred to as "0th order transmitted light component") can be reduced, by locating the single lenses 21 on the transparent base material 10 without a gap (in other words, locating the single lenses 21 in such a manner that the filling rate of the single lenses is 100%). As a result, the single lens group 20 including a plurality of single lenses 21 located adjacent to each other can further improve diffusion capability.

Also, in the single lens group 20 according to the present embodiment, each single lens 21 is not located regularly, but is located irregularly (at random), as schematically illustrated in FIG. 1. Here, "irregular" means regularity relevant to the location of the single lens 21 does not exist practically, in an arbitrary region of the single lens group 20 in the diffuser plate 1. Thus, even if a certain kind of regularity exists in the location of the single lens 21 at a microscopic region in an arbitrary region, the arbitrary region having no regularity in the location of the single lens 21 as a whole is assumed to be included in "irregular". Note that an irregular locating method of the single lens 21 in the single lens group 20 according to the present embodiment will be described again in detail below.

In the present embodiment, the single lens 21 constituting the single lens group 20 is a convex lens. In addition, in the single lens group 20 according to the present embodiment, the surface shape of each single lens 21 is not particularly limited, and may only include a spherical component, or may include an aspherical component.

In addition, the single lens group 20 according to the present embodiment has variations not only in the locations of the respective single lenses 21 as described above, but also in the aperture sizes and radii of curvatures of the respective single lenses 21 in the single lens group 20 as a whole.

By providing a plurality of single lenses 21 so as to be adjacent to one another, forming the single lenses 21 irregularly on the transparent base material 10, and providing variations (randomness) in the aperture sizes and radii of curvatures of the respective single lenses 21, outer shapes of the respective single lenses 21 are not identical shapes to one another, but have various shapes as schematically illustrated in FIG. 1, and many single lenses 21 do not have symmetry.

In such a case, as schematically illustrated in FIG. 2, many situations occur in which a single lens A has a radius of curvature $r_A$, whereas a single lens B has a radius of curvature $r_B$ ($\neq r_A$). In a case where adjacent single lenses are different in radius of curvature, the boundary between the adjacent single lenses is not structured by a straight line alone, but at least partly includes a curve. As a result, as schematically illustrated in FIG. 3, the outer shapes of the single lenses 21 (a projection trajectory of outer shapes in a case of overviewing the single lenses 21) include a plurality of bent and curved boundaries different from one another. With curves included at least partly in the boundaries between the single lenses, regularity in the location at the boundaries between the single lenses is further broken, and it is possible to further reduce a refraction component.

FIG. 4 is a scanning electron microscope (SEM) picture in a case where part of the single lens group 20 in the diffuser plate according to the present embodiment is monitored from above by an SEM. As is apparent from FIG. 4, it is seen that the outer shapes (an overview projection trajectory) of the single lenses 21 constituting the single lens group 20 have various shapes, and that the single lenses 21 are also different in aperture size from one another.

<With Regard to Locating Method of Single Lenses 21>

Hereinafter, a locating method of the single lenses 21 as described above will be specifically described.

In the diffuser plate 1 according to the present embodiment, the single lens group 20 in which a plurality of single lenses 21 having characteristics as described above are located can be achieved mainly by the following two locating methods.

The first array method is a scheme of once setting a state (hereinafter also referred to as "initial array state") serving as a reference in which the single lenses 21 having a shape serving as a reference are located regularly, and then varying (perturbing) the shapes (that is, the aperture sizes and radii of curvatures) of the single lenses 21 and the locating positions (in more detail, the vertex positions of the single lenses 21) from such an initial locating state. Hereinafter, this locating method will also be referred to as "reference locating method." In this locating method, upon experiencing a regular array of the single lenses 21, randomness is provided for the shapes and locations of the single lenses 21. Therefore, as is apparent from an SEM picture illustrated in FIG. 5A illustrating an actual appearance of locating the single lens group 20, such a location that an initial array state can be estimated to some degree when overviewing the single lens group 20 macroscopically to some degree is achieved.

The second locating method is a locating method of locating the single lenses 21 having a shape serving as a reference at random from the beginning. Hereinafter, this locating method will also be referred to as "random locating method." In this locating method, the single lenses 21 having a shape serving as a reference are located at random, and then the shapes (that is, the aperture sizes and radii of curvatures) of the single lenses 21 are varied (perturbed). Therefore, as is apparent from an SEM picture illustrated in FIG. 5B illustrating an actual appearance of locating the single lens group 20, regularity cannot be found in the locations of the single lenses 21 even in a case of overviewing the single lens group 20 macroscopically to some degree.

[With Regard to Reference Locating Method]

Hereinafter, with reference to FIGS. 6A and 6B, a flow of the reference locating method will be briefly described.

Figure 6A:
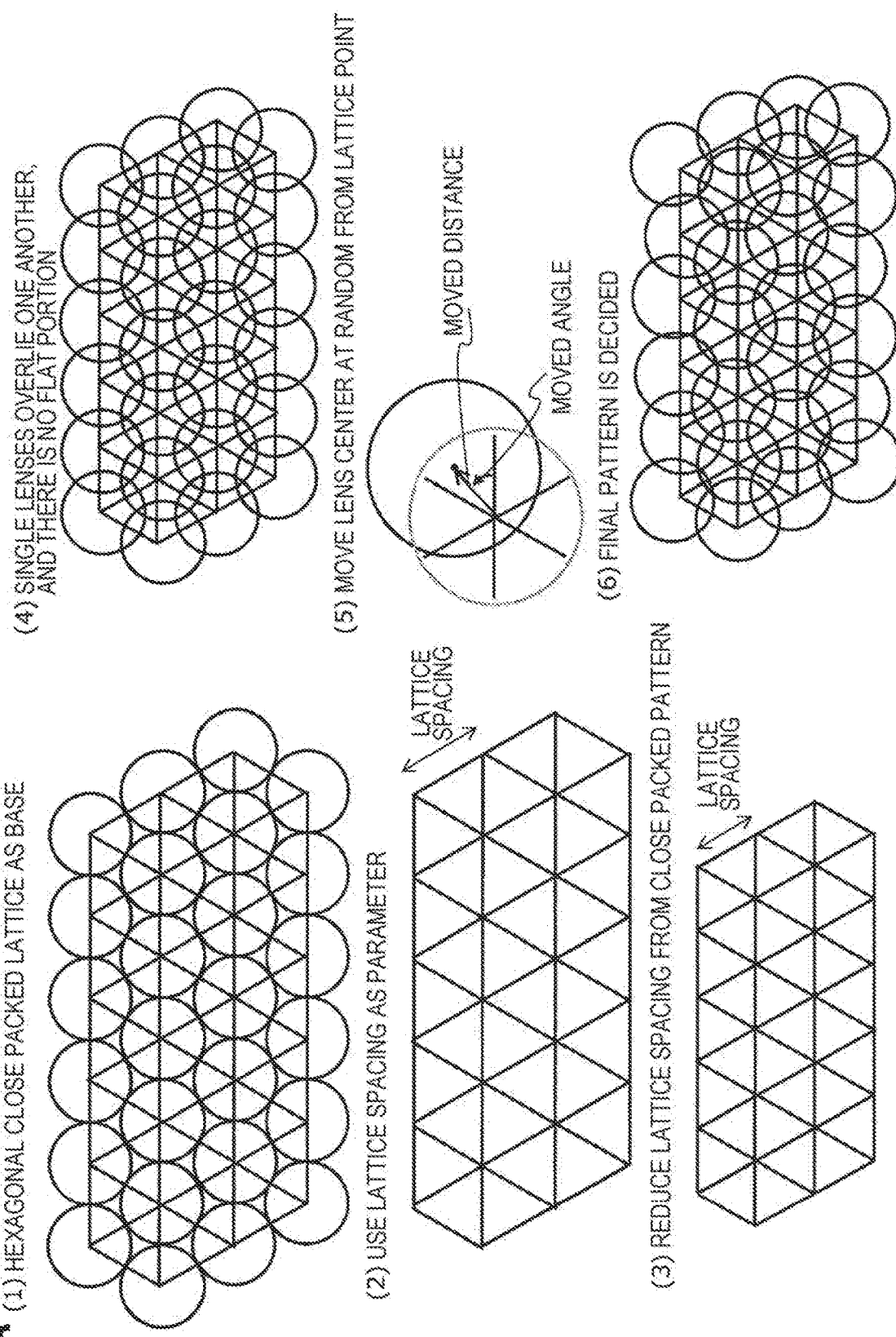
FIG. 6A is an explanatory diagram for describing a locating method of the single lens group that the diffuser plate according to the embodiment includes.

As illustrated in FIG. 6A, in the reference locating method, first, an initial array state serving as a reference is set first. A regular array state of the single lenses 21 is not particularly limited, but a rectangular location in which the vertex positions of the single lenses 21 are located in a square manner, a hexagonal location in which the vertex positions of the single lenses 21 are located at positions corresponding to the vertices of a hexagon and the center of the hexagon, or the like may be utilized as appropriate. On this occasion, in order to minimize occurrence of a flat portion in the single lens group 20 after carrying out the reference locating method, it is preferable that the regular array state be a close packed array state such as a hexagonal close packed lattice.

In such a reference locating method, as illustrated in the diagram at the middle on the left side in FIG. 6A, the lattice spacing (a reference lattice pitch G in FIG. 6B) is used as a parameter. Then, as illustrated in the diagram at the bottom on the left side in FIG. 6A, the lattice spacing which is a parameter is reduced from a value corresponding to a close packed pattern. Accordingly, as illustrated in the diagram at the top on the right side in FIG. 6A, the respective single lenses overlie one another, so that there is no flat portion.

Thereafter, as illustrated in the diagram at the middle on the right side in FIG. 6A, the lens center (vertex position) of each single lens 21 is moved at random from a lattice point. Specifically, using the maximum moved distance from a lattice point as a parameter (a maximum perturbation amount M in FIG. 6B), and using the product of a random number of 0 to 1 and the maximum moved distance as a moved distance, a decision is made individually. In addition, a moved angle is also decided using a random number. Accordingly, as illustrated in the diagram at the bottom on the right side in FIG. 6A, the final locating pattern of the single lenses 21 is decided.

Figure 6B:
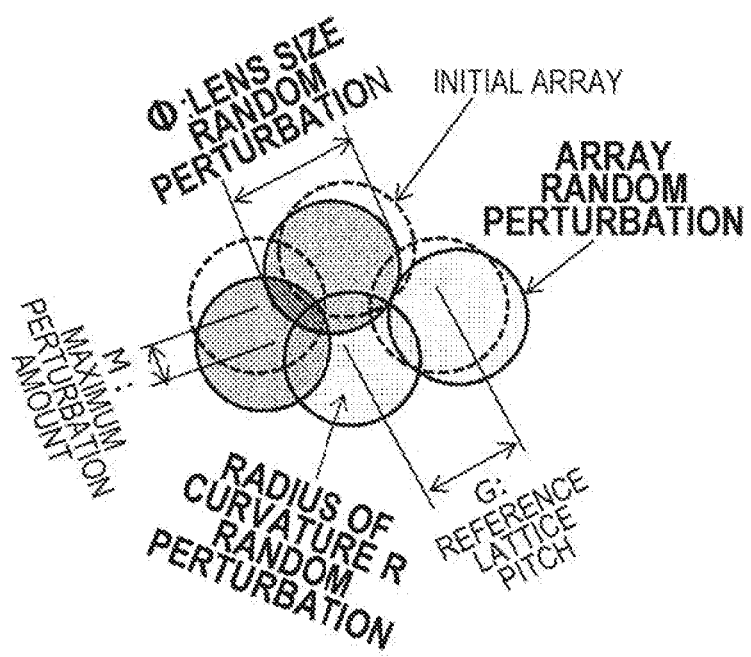
FIG. 6B is an explanatory diagram for describing a locating method of the single lens group that the diffuser plate according to the embodiment includes.

Thereafter, by further performing perturbation using the aperture size φ and the radius of curvature R of the single lenses 21 as illustrated in FIG. 6B as parameters, it is possible to locate at random the single lenses 21 having random shapes.

In the reference locating method as described above, it is preferable that Expression (101) below be satisfied, where the maximum moved amount (the maximum perturbation amount in FIG. 6B) in the single lens group 20 is represented by M, the reference aperture size of the single lens group 20 is represented by φ, and the reference radius of curvature of the single lens group 20 is represented by R. In addition, it is preferable that Δr/φ≠0 be satisfied, where, a moved amount from the initial array in the single lens group 20 is represented by Δr, and the reference aperture size of the single lens group 20 is represented by φ.

[Math. 7]

$$\frac{M}{2} \times \frac{2}{\sqrt{\phi^2 + R^2}} \geq 0.12 \qquad \text{Expression (101)}$$

In a case where a perturbation ratio expressed by the left side of Expression (101) above is less than 0.12, the degree of variations in parameters for achieving a random location will be insufficient, and it will be difficult to achieve sufficient randomness. In addition, that Δr/φ≠0 is satisfied means displacing the vertex positions of all the single lenses 21 from regular vertex positions. In this manner, it is possible to introduce irregularity more reliably for the locations of the single lenses 21 in the single lens group 20.

[With Regard to Random Locating Method]

Figure 7B:
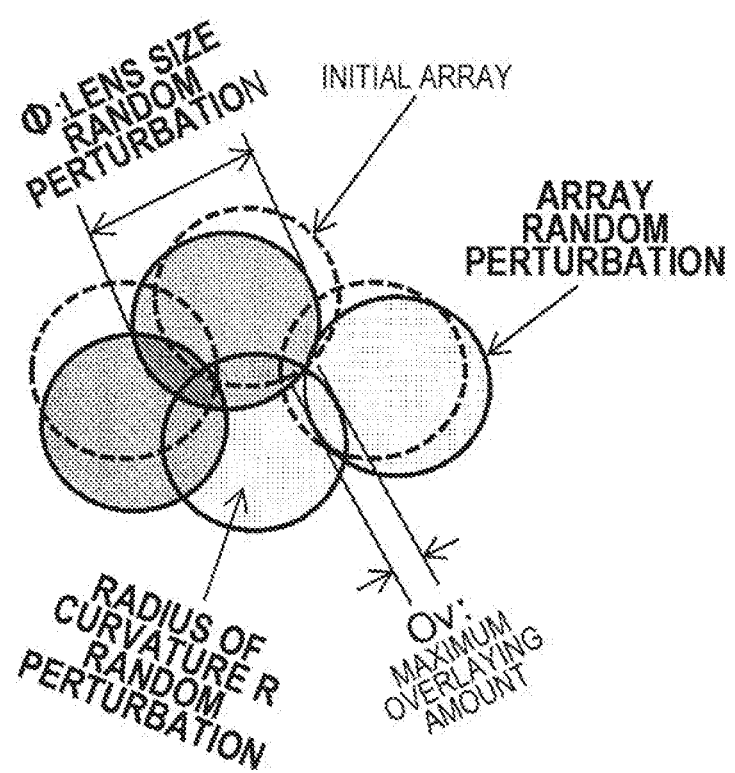
FIG. 7B is an explanatory diagram for describing a locating method of the single lens group that the diffuser plate according to the embodiment includes.

Next, with reference to FIGS. 7A and 7B, a flow of the random locating method will be briefly described.

In the random locating method, as illustrated in FIG. 7A, in a case of considering the lens locating position in the xy coordinate system, the x coordinate and y coordinate of the lens locating position are decided by random numbers. On this occasion, for a single lens 21 of interest, the distance from each single lens 21 already located is calculated, and if the overlying width with the single lenses 21 already located falls within a previously set acceptable range, the single lens 21 of interest shall be located. Conversely, in a case where the calculated overlying width exceeds the acceptable range, the single lens 21 of interest shall not be located. In this manner, the initial array in the random locating method is decided.

The acceptable range in the locating method as described above is a maximum overlaying amount $O_v$ illustrated in FIG. 7B. It is possible to regard this maximum overlaying amount $O_v$ as the maximum value of the overlying width between the single lenses 21 adjacent to each other.

The foregoing is an overview of the random locating method, and a more specific algorithm for the random locating method is not particularly limited, but it is possible to utilize a publicly-known method as disclosed in JP 2012-181816A, for example.

After deciding the initial array in the above manner, by further performing perturbation using the aperture size φ and the radius of curvature R of the single lenses 21 as illustrated in FIG. 7B as parameters, it is possible to locate at random the single lenses 21 having random shapes, and it is possible to suppress occurrence of a flat portion.

In the random locating method as described above, it is preferable that Expression (103) below be satisfied, where the maximum value of the overlying width between single lenses adjacent to each other in the single lens group 20 is represented by $O_v$, the reference aperture size of the single lens group 20 is represented by φ, and the reference radius of curvature of the single lens group 20 is represented by R.

[Math. 8]

$$\frac{O_v}{\sqrt{\phi^2 + R^2}} \geq 0.12 \qquad \text{Expression (103)}$$

In a case where the perturbation ratio expressed by the left side of Expression (103) above is less than 0.12, the degree of variations in parameters for achieving the random location will be insufficient, and it will be difficult to achieve sufficient randomness.

The locating method of the single lenses 21 according to the present embodiment has been specifically described above with reference to FIGS. 6A to 7B.

Figure 8A:
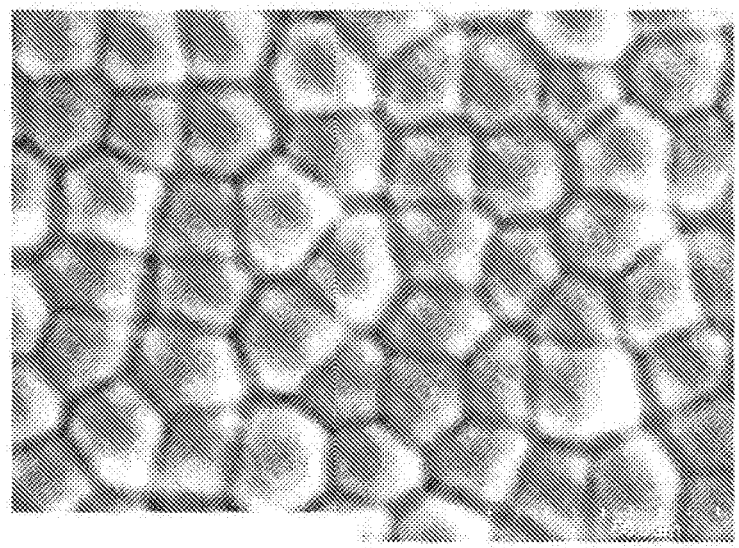
FIG. 8A is an electron micrograph of an example of the single lens group that the diffuser plate according to the embodiment includes as seen from above.
Figure 8B:
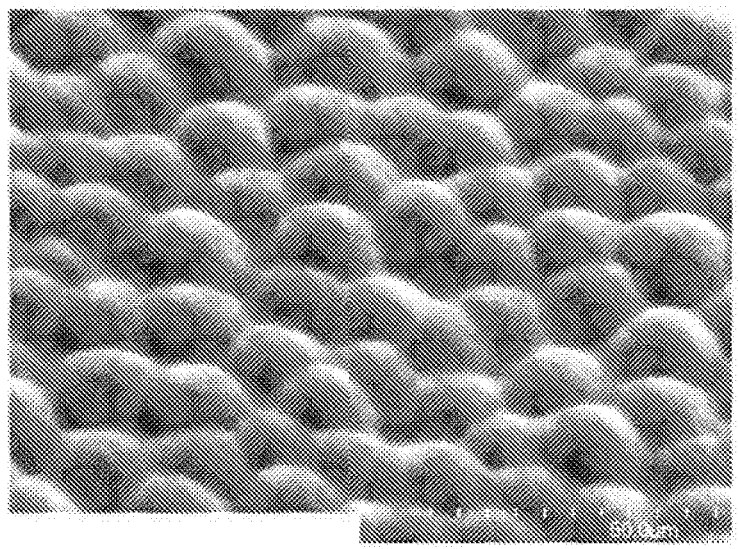
FIG. 8B is an electron micrograph of an example of the single lens group that the diffuser plate according to the embodiment includes as seen from above.

FIGS. 8A and 8B are results of monitoring by SEM an appearance of the single lens group 20 in a case of locating the single lenses 21 in the above manner. FIG. 8A is an SEM picture in a case of looking at the single lens group 20 from above, and FIG. 8B is an SEM picture in a case of looking down the single lens group 20 in a diagonal direction. The single lens group 20 illustrated in FIGS. 8A and 8B is an example in a case of assuming that the aperture size (the aperture size before perturbation) φ serving as a reference is 30 μm and the radius of curvature (the radius of curvature before perturbation) R serving as a reference is 20 μm.

As is apparent from FIG. 8A, it is seen that the respective single lenses 21 have various outer shapes and have been located at random. In addition, as is apparent from FIG. 8B, it is seen that the respective single lenses 21 vary in lens height variously, and the boundaries between the single lenses 21 adjacent to each other present curved surfaces. Through detailed analysis of these SEM pictures, the maximum elevation difference in vertex position between the single lenses 21 was approximately 8 μm, and the surface roughness (Ra) at the vertex positions of the single lenses 21 was approximately 6 nm.

<Location Properties of Single Lens Group 20>

Location properties of the single lens group 20 achieved by the locating method of the single lenses 21 as described above will be briefly described below.

In the single lens group 20 achieved by the locating method as described above, it is preferable that Expression (105) be satisfied, where the reference aperture size (the aperture size before perturbation) of the single lens group 20 is represented by φ, and a perturbation width which is the degree of variations in aperture sizes in the single lens group 20 is represented by Δφ.

[Math. 9]

$$5\% \leq \left|\frac{\Delta\phi}{\phi}\right| \leq 25\% \qquad \text{Expression (105)}$$

In a case where the ratio expressed by |Δφ/φ| is less than 5%, the degree of variations in aperture sizes will be insufficient, and consequently, randomness of the locations of the single lenses 21 will be insufficient, which is not preferable. In addition, in a case where the ratio expressed by |Δφ/φ| exceeds 25%, deformations of the structure of the single lenses 21 themselves and the macroscopic structure of the single lens group 20 will be increased abruptly as FIG. 9A shows an SEM picture in a case where |Δφ/φ|=25%, which is not preferable.

In addition, in the single lens group 20 achieved by the locating method as described above, it is preferable that Expression (107) below be satisfied, where the reference radius of curvature (the radius of curvature before perturbation) of the single lens group 20 is represented by R, and the perturbation width which is the degree of variations in radii of curvatures in the single lens group 20 is represented by ΔR.

[Math. 10]

$$5\% \leq \left|\frac{\Delta R}{R}\right| \leq 70\% \qquad \text{Expression (107)}$$

In a case where the ratio expressed by |ΔR/R| is less than 5%, the degree of variations in radii of curvatures will be insufficient, and consequently, randomness of the locations of the single lenses 21 will be insufficient, which is not preferable. In addition, in a case where the ratio expressed by |ΔR/R| exceeds 70%, deformations of the structure of the single lenses 21 themselves and the macroscopic structure of the single lens group 20 will be increased abruptly as FIG. 9B shows an SEM picture in a case where |ΔR/R|=70%, which is not preferable.

In addition, it is preferable that Expression (109) below be satisfied, where the maximum elevation difference in vertex position between the single lenses 21 constituting the single lens group 20 is represented by $\Delta Z_{max}$, and the maximum vertex height in the single lens group 20 is represented by Z.

[Math. 11]

$$\frac{\Delta Z_{max}}{Z} \geq 0.015 \qquad \text{Expression (109)}$$

In a case where the ratio expressed by $|\Delta Z_{max}/Z|$ is less than 0.015, the single lenses 21 are extremely uniform in vertex height (lens height), and it will be difficult to achieve even diffusion angle distribution properties, which is not preferable.

In addition, in the single lens group 20 in which the single lenses 21 as described above are located, it is preferable that the proportion of a flat portion (for example, the proportion of an area where a flat portion exists to the area of the transparent base material 10) be less than 10%. In a case where the proportion of a flat portion is more than or equal to 10%, the 0th order transmitted light component will be increased, and diffusion angle distribution properties may be degraded, which is not preferable.

Note that, in the diffuser plate according to the present embodiment, anisotropy may be provided for the location properties of the single lens group 20 as described above.

<With Regard to Transmitted Light Energy Distribution of Diffuser Plate>

Next, with reference to FIGS. 10 and 11, transmitted light energy distribution of the diffuser plate 1 having the single lens group 20 as described above will be specifically described.

When collimated light in a visible light region or telecentric light having a principal ray with a collimating property and having a certain aperture enters into the diffuser plate 1 as described above, top hat type diffusion as schematically illustrated in FIG. 10 is achieved in which homogeneity of energy distribution is very high within an angular component in a certain region, and energy is abruptly reduced when the certain region of this angular component is exceeded.

Here, as illustrated in FIG. 10, in a case of assuming that a diffusion angle width of a region in which homogeneity of energy distribution is high is represented by $\theta_{top}$, and a full width at half maximum of such energy distribution is represented by $\theta_{FWHM}$, an appearance of fluctuations in energy ratio in a case of changing the ratio $\theta_{top}/\theta_{FWHM}$ (=a) was analyzed utilizing a commercially available application for ray tracing simulation. Obtained results are illustrated in FIG. 11.

As a result, it has been clarified that, in a case where the ratio a becomes more than or equal to ⅓, homogeneous central energy as schematically illustrated in FIG. 10 is achieved, not Gaussian diffusion apparently. In addition, it has been clarified that, in a case where the ratio a becomes more than or equal to ½, the central energy in a homogeneous region becomes 20%, and diffusivity with the light collecting function is achieved.

Consequently, in the diffuser plate 1 according to the present embodiment, it is preferable that Expression (111) below be satisfied.

[Math. 12]

$$\frac{\theta_{top}}{\theta_{FWHM}} \geq \frac{1}{3} \qquad \text{Expression (111)}$$

<With Regard to Specific Example of Geometrical-Optical Diffusion Properties of Diffuser Plate>

Next, with reference to FIG. 12, geometrical-optical diffusion properties of the diffuser plate 1 having the single lens group 20 as described above will be specifically described.

In the diffuser plate 1 according to the present embodiment, by forming the single lens group 20 as described above on the transparent base material 10, it is possible to achieve top hat type diffusion in which the diffusion angle is ±35° in a case where it is assumed that the reference aperture size φ is 30 µm and the reference radius of curvature R is 20 µm. Such distribution properties indicate that light entered into the diffuser plate 1 at a spot diffuses to a range of 144 mm at a position 100 mm away from the diffuser plate 1.

The diffuser plate 1 according to the present embodiment has been described above in detail with reference to FIGS. 1 to 12.

The diffuser plate 1 according to the present embodiment as described above can achieve more even diffusion angle distribution properties by providing randomness for the locations of the single lenses 21 and the shapes (the aperture sizes and radii of curvatures) of the single lenses 21. In addition, in the diffuser plate 1 according to the present embodiment, by controlling the aperture sizes and radii of curvatures of the single lenses 21, it is possible to freely design the diffusion angle of light having transmitted through the diffuser plate 1.

(With Regard to Manufacturing Method of Diffuser Plate)

Figure 13:
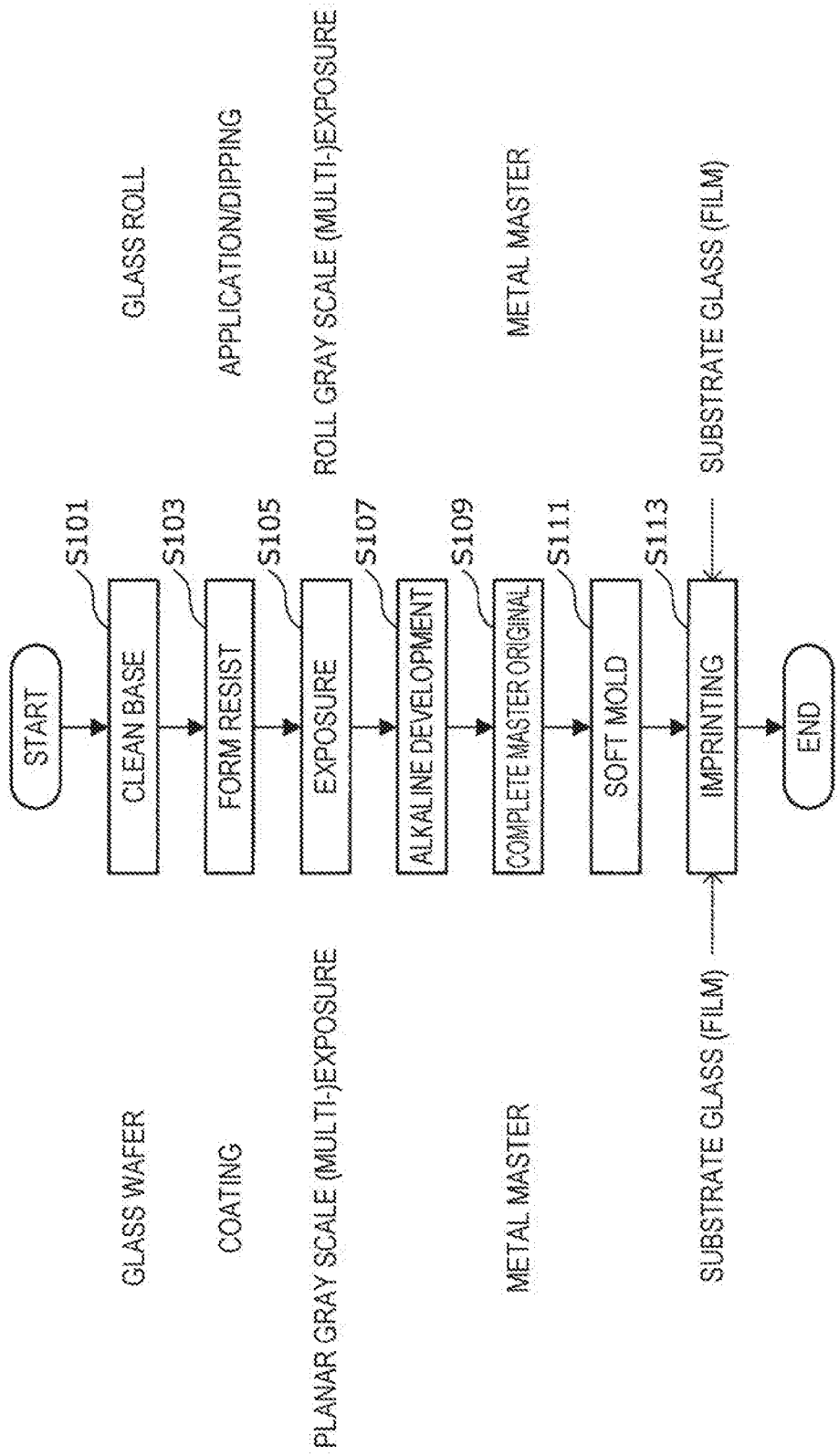
FIG. 13 is a flowchart illustrating an example of a flow of a manufacturing method of the diffuser plate according to the embodiment.

Hereinafter, with reference to FIG. 13, an example of a manufacturing method of the diffuser plate 1 according to the first embodiment of the present invention will be briefly described. FIG. 13 is a flowchart illustrating an example of a flow of the manufacturing method of the diffuser plate according to the present embodiment.

In the manufacturing method of the diffuser plate according to the present embodiment, cleaning of a base is carried out first (step S101). For example, such a base may be a roll-like base such as a glass roll, or may be a planar base such as a glass wafer.

Next, a resist (such as resist in which a metal oxide is used, for example) is formed on the base after cleaning (step S103). Processing of forming such a resist is achieved by application processing or dipping for a roll-like base, and achieved by various kinds of coating processing for a planar base.

Thereafter, exposure processing is carried out on the base on which the resist has been formed (step S105). To such exposure processing, it is possible to apply as appropriate a publicly-known exposure method such as exposure through use of a gray scale mask or multi-exposure performed by overlaying a plurality of gray scale masks.

Thereafter, by subjecting the base after exposure to alkaline development (step S107), a master original (such as a glass master or a metal master, for example) for manufacturing the diffuser plate 1 according to the present embodiment is completed (step S109). Thereafter, a soft mold is manufactured using the completed master original (step S111).

Next, by carrying out imprinting processing on a substrate glass, a substrate film, or the like utilizing the manufactured soft mold (step S113), the diffuser plate 1 according to the present embodiment is manufactured.

Note that the flow of the manufacturing method illustrated in FIG. 13 is merely an example, and the manufacturing method of the diffuser plate according to the present embodiment is not limited to the example illustrated in FIG. 13.

(Application Example of Diffuser Plate)

Next, with reference to FIG. 14, an application example of the diffuser plate 1 according to the present embodiment will be briefly described. FIG. 14 is an explanatory diagram schematically illustrating an example of an application example of the diffuser plate according to the present embodiment.

Note that the diffuser plate 1 according to the present embodiment described above is provided as appropriate in a device that needs to diffuse the light to provide its function. The device that needs to diffuse the light to provide the function is a display device such as various types of displays, a projection device such as a projector, and the like, for example.

In addition, the diffuser plate 1 according to the present embodiment is also applicable to a backlight of a liquid crystal display device as illustrated at the top of FIG. 14, and can also be used for optical shaping application as illustrated at the middle of FIG. 14. Further, as illustrated at the bottom of FIG. 14, the diffuser plate 1 according to the present embodiment can also be applied to various lighting devices.

Also, the device that needs to diffuse the light to provide the function is not limited to the above examples, and the diffuser plate 1 according to the present embodiment can be applied to other publicly known devices, as long as it is a device that utilizes diffusion of light.

EXAMPLE

Next, the diffuser plate according to the present invention will be described specifically, with Examples and Comparative Examples. Note that the Examples described below are just an example of the diffuser plate according to the present invention, and the diffuser plate according to the present invention is not limited to the following examples.

Test Examples

Hereinafter, utilizing a commercially available application for ray tracing simulation, various properties in cases where the single lenses 21 were located by the reference locating method and the random locating method, respectively, were simulated. Note that, in the following simulations, a lens material that forms the single lenses 21 was transparent resin or glass.

Examples 1 to 3

In Examples 1 to 3, a hexagonal close packed lattice was used as a reference location, and the shape (the aperture size φ, the radius of curvature R, each perturbation amount) and a location spacing G of single lenses, and the maximum perturbation amount M were set at the respective conditions as in Table 1 below.

Comparative Example 1

In Comparative Example 1, upon setting the perturbation amounts of the aperture size φ and the radius of curvature R at 0, the respective conditions were set as in Table 1 below.

Comparative Example 2

In Comparative Example 2, upon setting the perturbation amounts of the aperture size φ and the radius of curvature R at less than 0.12, the respective conditions were set as in Table 1 below.
(Evaluation Method)
Note that criteria for performance determination are as follows.
A: The diffused light distribution has a top hat shape, and an energy change at a top part is less than or equal to 20%
B: The diffused light distribution has a top hat shape, and an energy change at the top part exceeds 20%
C: The diffused light distribution does not have a top hat shape (discrete diffraction)

Figure 16:
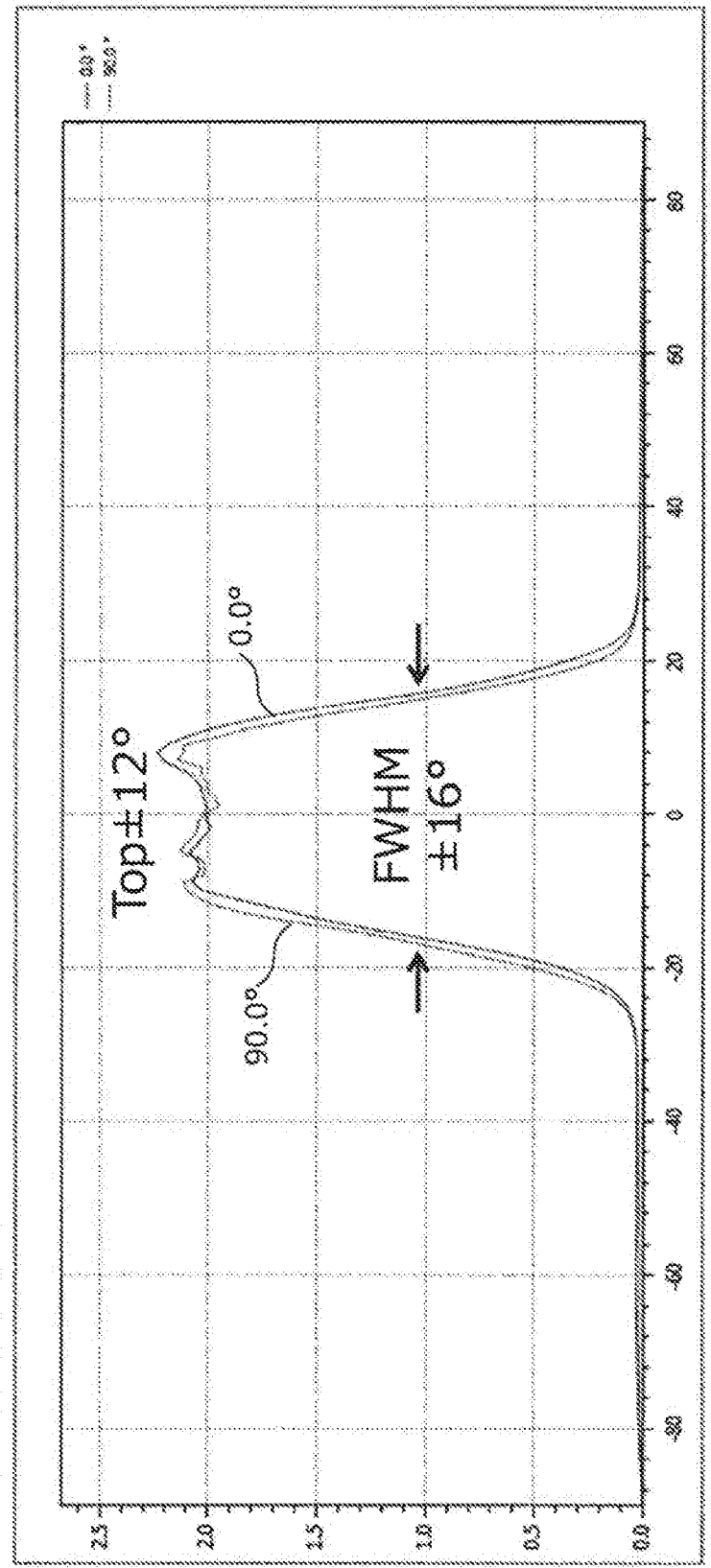
FIG. 16 is an explanatory diagram for describing results of Example 1.

Obtained results are also shown in Table 1 below. In Examples 1 to 3, it is seen that the diffusion distribution has a top hat shape with different TOP widths, and desired properties have been obtained. FIGS. 15 and 16 illustrate simulation results of the diffuser plate shown in Example 1. As is also apparent particularly from energy distribution properties illustrated in FIG. 16, it is seen that top hat type distribution properties have been achieved.

On the other hand, in Comparative Example 1 and Comparative Example 2, it has been clarified that the diffusion distribution has a non-top hat shape of discrete diffraction, so that desired optical properties are not obtained.

Examples 4 to 11

In Examples 4 to 11, the random location was used as the reference location, and the shapes (the aperture size φ, radius of curvature R, each perturbation amount) and locations (Ex, $O_v$) of single lenses were set at the respective conditions as in Table 2 below.

Comparative Example 3

In Comparative Example 3, upon setting the perturbation amounts of the aperture size φ and the radius of curvature R at less than 0.12, the respective conditions were set as in Table 2 below.

Here, in Examples 4 to 11 and Comparative Example 3 above, criteria for performance determination are as described above.

Obtained results are also shown in Table 2 below. In Examples 4 to 11, it is seen that the diffusion distribution has a top hat shape with different TOP widths, and desired properties have been obtained. FIGS. 17 and 18 illustrate simulation results of the diffuser plate shown in Example 4. As is also apparent particularly from energy distribution properties illustrated in FIG. 18, it is seen that top hat type distribution properties have been achieved.

On the other hand, in Comparative Example 3, it has been clarified that the diffusion distribution has a non-top hat shape of discrete diffraction, so that desired optical properties are not obtained.

TABLE 1

|  | Reference aperture size φ μm | Perturbation width φ±(%) | Radius of curvature R μm | R Perturbation±(%) | Hexagonal lattice spacing G μm | Maximum perturbation amount M(/2) μm | φ · R Perturbation ratio |
|---|---|---|---|---|---|---|---|
| Example 1 | 45 | 10 | 40 | 10 | 28 | 11 | 0.183 |
| Example 2 | 130 | 10 | 500 | 10 | 80 | 80 | 0.155 |
| Example 3 | 150 | 10 | 300 | 10 | 103 | 43 | 0.128 |
| Comparative Example 1 | 150 | 0 | 300 | 0 | 110 | 40 | 0.119 |
| Comparative Example 2 | 100 | 10 | 150 | 10 | 78 | 19 | 0.105 |

|  | Elevation Difference Z | Dispersion | Elevation difference between adjacent vertices | $\Delta Z_{max}/Z$ | TOP width degree (±) | FWHM degree (±) | Performance determination |
|---|---|---|---|---|---|---|---|
| Example 1 | 9.7 | 2.21 | 0.48 | 0.049 | 12 | 16 | A |
| Example 2 | 4.8 | 0.97 | 0.12 | 0.025 | 2 | 4 | A |
| Example 3 | 11.7 | 6.00 | 0.24 | 0.021 | 4 | 6 | B |
| Comparative Example 1 | 9.1 | 3.70 | 0.20 | 0.022 | — | — | C |
| Comparative Example 2 | 9.8 | 3.70 | 0.30 | 0.031 | — | — | C |

TABLE 2

| | Reference aperture size ϕ μm | Perturbation width ϕ±(%) | Radius of curvature R μm | R Perturbation±(%) | Diameter expansion amount Ex μm | Maximum overlapping amount Ov μm | ϕ · R Perturbation ratio |
|---|---|---|---|---|---|---|---|
| Example 4 | 30 | 5 | 20 | 5 | 5 | 11 | 0.444 |
| Example 5 | 60 | 10 | 60 | 10 | 13 | 12 | 0.295 |
| Example 6 | 55 | 10 | 60 | 10 | 12 | 11 | 0.283 |
| Example 7 | 80 | 10 | 100 | 10 | 17 | 21 | 0.297 |
| Example 8 | 100 | 10 | 150 | 10 | 21 | 20 | 0.227 |
| Example 9 | 100 | 10 | 150 | 10 | 15 | 34 | 0.272 |
| Example 10 | 150 | 10 | 300 | 10 | 31 | 30 | 0.182 |
| Example 11 | 180 | 10 | 570 | 10 | 37 | 36 | 0.122 |
| Comparative Example 3 | 100 | 10 | 150 | 10 | 8 | 13 | 0.116 |

| | Elevation difference Z | Dispersion | Elevation difference between adjacent vertices | $\Delta Z_{max}/Z$ | TOP width degree (±) | FWHM degree (±) | Performance determination |
|---|---|---|---|---|---|---|---|
| Example 4 | 10.2 | 1.04 | 0.88 | 0.086 | 15 | 24 | A |
| Example 5 | 11.2 | 3.20 | 0.59 | 0.053 | 10 | 13 | A |
| Example 6 | 9.1 | 2.10 | 0.52 | 0.057 | 8 | 12 | A |
| Example 7 | 11.2 | 2.50 | 0.39 | 0.035 | 7 | 10 | A |
| Example 8 | 11.3 | 3.50 | 0.33 | 0.029 | 6 | 10 | A |
| Example 9 | 10.9 | 2.20 | 0.30 | 0.028 | 4 | 7 | A |
| Example 10 | 11.9 | 4.20 | 0.22 | 0.018 | 4 | 6 | B |
| Example 11 | 8.9 | 2.50 | 0.14 | 0.016 | 3 | 5 | B |
| Comparative Example 3 | 10.9 | 8.00 | 0.34 | 0.031 | — | — | C |

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST 1 diffuser plate
10 transparent base material
20 single lens group
21 single lens

The invention claimed is:

1. A diffuser plate of a microlens array type, the diffuser plate comprising: a single lens group located on a surface of a transparent base material, wherein aperture sizes and radii of curvatures of respective single lenses constituting the single lens group vary in the single lens group as a whole, and vertex positions of the respective single lenses are located irregularly, Expression (4) below is satisfied, where, in energy distribution of light that transmits through the single lens group, a diffusion angle range in which the energy distribution becomes substantially even is represented by $\theta_{top}$, and a full width at half maximum of the energy distribution is represented by $\theta_{FWHM1}$, $\theta_{top}/\theta_{FWHM1} \geq 1/3$ Expression (4), the respective single lenses constituting the single lens group are located irregularly on the transparent base material, and Expression (6) below is satisfied, where a maximum value of an overlying width between the single lenses adjacent to each other in the single lens group is represented by Ov, a reference aperture size of the single lens group is represented by φ, and a reference radius of curvature of the single lens group is represented by R, the respective single lenses constituting the single lens group are located irregularly on the transparent base material, and Expression (6) below is satisfied, where a maximum value of an overlying width between the single lenses adjacent to each other in the single lens group is represented by $o_v$, a reference aperture size of the single lens group is represented by φ, and a reference radius of curvature of the single lens group is represented by R, $$\frac{O_v}{\sqrt{\phi^2 + R^2}} \geq 0.12. \qquad \text{Expression (6)}$$

2. The diffuser plate according to claim 1, wherein
boundaries between microlenses constituting the microlens array and adjacent microlenses include curves different from one another, each of the boundaries being formed between one of the single lenses and an adjacent one of the single lenses.

3. The diffuser plate according to claim 1, wherein
Expression (1) below is satisfied, where a reference aperture size of the single lens group is represented by φ, and a perturbation width which is a degree of variations in aperture sizes in the single lens group is represented by Δφ

$$5\% \leq \left|\frac{\Delta\phi}{\phi}\right| \leq 25\%. \qquad \text{Expression (1)}$$

4. The diffuser plate according to claim 1, wherein
Expression (2) below is satisfied, where a reference radius of curvature of the single lens group is represented by R, and a perturbation width which is a degree of variations in radii of curvatures in the single lens group is represented by ΔR $$5\% \leq \left|\frac{\Delta R}{R}\right| \leq 70\%. \quad \text{Expression (2)}$$

5. The diffuser plate according to claim 1, wherein Expression (3) below is satisfied, where that a maximum elevation difference in the vertex positions between the single lenses constituting the single lens group is represented by $\Delta Z_{max}$, and a maximum vertex height in the single lens group is represented by Z $$\frac{\Delta Z_{max}}{Z} \geq 0.015. \quad \text{Expression (3)}$$

6. The diffuser plate according to claim 1, wherein the vertex positions of the respective single lenses constituting the single lens group are located at random using positions of vertices of the respective single lenses when assuming that the single lenses are arranged regularly as a reference, such that
Expression (5) below is satisfied, where a moved amount at maximum in the single lens group is represented by M, a reference aperture size of the single lens group is represented by φ, and a reference radius of curvature of the single lens group is represented by R $$\frac{M}{2} \times \frac{2}{\sqrt{\phi^2 + R^2}} \geq 0.12. \quad \text{Expression (5)}$$

7. The diffuser plate according to claim 6, wherein Δr/φ≠0 is satisfied, where the moved amount from the reference in the single lens group is represented by Δr, and a reference aperture size of the single lens group is represented by φ.

8. The diffuser plate according to claim 1, wherein the transparent base material is any of a resin substrate, a resin film, and a glass substrate.

9. A display device comprising the diffuser plate according to claim 1.

10. A projection device comprising the diffuser plate according to claim 1.

11. A lighting device comprising the diffuser plate according to claim 1.

\* \* \* \* \*